United States Patent [19]  [11] Patent Number: 4,719,759
Zaslavsky  [45] Date of Patent: Jan. 19, 1988

[54] METHOD OF AND MEANS FOR DISPOSING OF WASTE SALTS AND BRINES

[75] Inventor: Dan Zaslavsky, Rehovot, Israel

[73] Assignee: Solmat Systems, Ltd., Yavne, Israel

[21] Appl. No.: 943,830

[22] Filed: Dec. 16, 1986

Related U.S. Application Data

[63] Continuation of Ser. No. 510,893, Jul. 5, 1983, abandoned.

[51] Int. Cl.⁴ .................................................. F03G 7/02
[52] U.S. Cl. ....................................... 60/641.8; 165/45; 126/415
[58] Field of Search ........................... 60/641.8, 641.9; 165/45; 126/415, 416

[56] References Cited

U.S. PATENT DOCUMENTS 3,372,691  3/1968  Shachar .............................. 126/452
4,355,683  10/1982  Griffiths .......................... 126/415 X
4,377,071  3/1983  Assaf et al. ........................ 126/415 X
4,440,148  4/1984  Assaf ................................. 165/45

Primary Examiner—Stephen F. Husar
Attorney, Agent, or Firm—Sandler & Greenblum

[57] ABSTRACT

Waste salts and brines are disposed of by constructing salt water solar pond power plants, concentrating the waste salts and brines, and then introducing them into the heat storage layers of the solar ponds of the power plants. The basins in which such solar ponds are constructed are made deeper than needed to sustain operation of the power plant at its designed output; and after a deep basin is filled, the concentrated brine from the heat storage layer is available to construct another solar pond which is then available for storing additional waste salts. In concentrating the waste salts, sodium chloride will precipitate; and this material can be deposited at the bottom of the solar ponds to seal the same against leakage.

31 Claims, 3 Drawing Figures

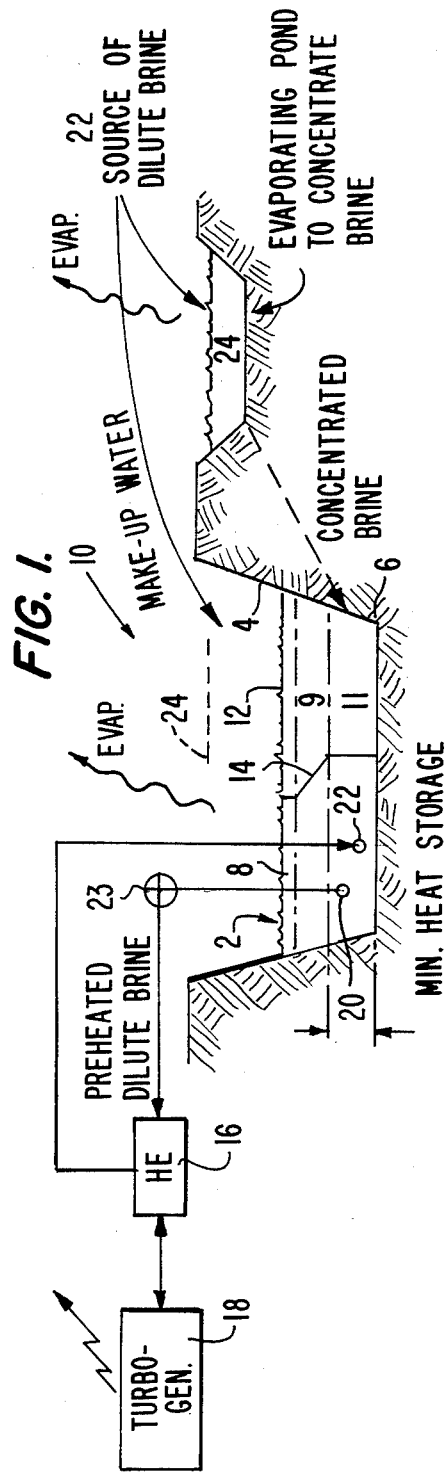

METHOD OF AND MEANS FOR DISPOSING OF WASTE SALTS AND BRINES

This application is a continuation of application Ser. No. 510,893, filed July 5, 1983, now abandoned.

DESCRIPTION

This invention relates to a method of and means for disposing of waste salts and brines.

BACKGROUND OF THE INVENTION

Solid salts and brines generated as waste in such industrial applications as food processing, mineral production (e.g., potassium and sodium chloride), and geothermal exploration, are potential pollutants which must be disposed of safely. Projects for the desalination of brackish bodies of water such as certain rivers (e.g., the lower Colorado in the southwest United States), bays, and salt-water lakes, also produce brines that must be disposed of safely. Also, solution mining, to create cavities inside salt domes for storage of such materials as radioactive wastes or reserve oil supplies, produces waste brine which must be disposed of. The disposal of these salts poses a serious environmental problem.

Seepage of brines into fresh water will degrade its quality. Projects have been established to intercept such brines at their source, e.g., along the Colorado River Basin, along the Red River Basin, and in the vicinity of the Sea of Galilee in Isreal. Interception of brines, however, does not resolve the problem of disposing of the brine once intercepted. Dumping these wastes on the ground or burying them at waste-disposal sites may make nearby land unarable because of the possibility of seepage into underground water systems. Moreover, the entry of these salts into the underground water systems will have a serious negative impact on the supply of water for drinking, for agriculture or for industrial use.

Common solutions to this problem have been to dispose of the waste brine in the sea or to store it in ponds or in underground cavities which have been lined with concrete or asphalt or with plastic barriers. Such solutions, however, are very costly: disposal in the sea involves substantial transportation costs; ponds and underground cavities must be installed and lined, and pumping stations and necessary conduits must be provided--all involving significant expenses for labor, materials and energy, as well as the costs of transporting the brine to the disposal site.

It is an object of this invention to provide a new and improved method of and means for disposing of waste salts and brines.

SUMMARY OF THE INVENTION

According to the present invention, waste salts and brines are disposed of by constructing salt water solar pond power plants, concentrating the waste salts and brines, and then introducing them into the solar ponds of the power plants whereby the levels of the ponds are increased. A conventional salt water solar pond power plant comprises a salt water solar pond which has an upper convective layer, nominally about 25 to 50 cm deep depending upon ambient weather conditions, an intermediate stratified, non-convective halocline, nominally about 1 m deep, and a lower heat storage layer from 2.5 to 5 m deep depending upon the design parameters of the power plant. Generally, as disclosed in U.S. Pat. No. 4,377,071, the disclosure of which is hereby incorporated by reference, the salinity of the convective or wind-mixed layer is less than 5%, while the salinity of the halocline changes with depth from about 5% at the top to around 30% at the bottom. The salinity of the heat storage layer is uniform at around 30%.

In a conventional salt water solar pond, solar radiation penetrates into the pond heating the water in the wind-mixed layer, in the halocline, and in the heat storage layer. Because the wind-mixed layer is convective, practically all of the heat absorbed therein is returned to the atmosphere by conduction; and for this reason, this layer should be kept as shallow as possible. Heat absorbed in the halocline is trapped therein because the halocline is non-convective and acts as an insulator for the heat storage layer. After a period of time, the temperature profile of the pond will closely match its density profile. Eventually, the temperature in the heat storage layer may reach 110° C.

In operation, hot brine is extracted from the heat storage layer just below the halocline, piped into a heat exchanger where another fluid, usually an organic fluid, such as Freon, is vaporized; and the cooled brine is returned to the heat storage layer near the bottom of the pond where the temperature matches the temperature of the cooled brine. The vaporized organic fluid is piped from the heat exchanger to a turbine where the organic fluid expands. After expansion, the fluid is condensed and returned to the heat exchanger. Electricity is generated by coupling a generator to the turbine.

While a conventional salt water solar pond power plant requires only a relatively shallow solar pond (e.g., not less than about 2.5 m), the present invention contemplates providing a solar pond in a basin that is relatively deep, and specifically deeper than is needed to sustain operation of the power plant at its designed output. With this arrangement, waste brine is introduced into the pond at a level where the density of the water is not less than the density of the waste brine. Generally, the waste brine is introduced into the heat storage layer at the lower levels thereof so as not to cool the hot brine in the upper region of the heat storage layer.

If the waste brine is dilute, such as is the case where diversion of brackish water from fresh water rivers is carried out to reduce or control down-river salinity, then evaporating ponds can be employed to concentrate the brackish water to the level of the heat storage layer before the waste brine is introduced into the solar pond. This has the advantage of significantly reducing the volume of material that must be stored.

As concentrated waste brine is added to a solar pond, its surface level rises. This procedure can be followed until the level of the pond approaches the top of the basin containing the pond; and all during this procedure, the pond continues to operate as a heat source for the power plant. The upper or operative portion of the solar pond thus "floats" on the concentrated waste brine added to the pond.

In constructing a solar pond for use as a store for waste brine, the volume of the basin constructed for the pond will depend upon such factors as the annual volume of waste brine to be stored, the cost of excavation, and the availability of land for additional solar ponds. If additional land is available, the original solar pond can act as a breeder for another solar pond. That is to say, the cooler concentrated brine in the heat storage layer of the original pond can, after a period of time, be used as the base for another pond which can be constructed adjacent the first pond and provide an additional sink for waste brine. In such case, the electrical generating capacity of the power plant can be increased to utilize the heat collected in the newly formed solar pond.

It is mainly into the heat storage layer that waste salts and brine are added for disposal. When building up the pond, however, salt is needed in the halocline layer as well. Also, low concentration brines can be used to wash the top wind-mixed layer and as make-up to compensate for evaporation. Solid salts are added by dumping them to the bottom of the pond.

The disposal of waste salts and brines in saltwater solar ponds according to the present invention provides a variety of benefits and advantages. These include:

(1) the use of solar ponds as disposal sites for brine and solid salts to produce an environmentally acceptable and economically advantageous benefit from an otherwise waste product;

(2) the opportunity to make multipurpose use of individual installations such as pumping equipment, conduits, pond lining, etc., to service multiple solar ponds;

(3) the avoidance of transportation costs and costs of conduits and pumping stations by building the solar ponds near the source of the waste salts;

(4) low concentration brines can be converted into high concentration brines through the use of facilities such as solar evaporation ponds, thus substantially reducing the volume of equal quantities of salts and both facilitating and reducing the cost of transportation of the salt to the solar ponds;

(5) the use of waste salts in their crystalline state to line or pave the bottom of new solar ponds, providing the following benefits:

(a) strengthening a weak soil floor of the pond;

(b) providing a clean floor for the pond, thus avoiding turbidity and lack of transparency which could result from a soil floor;

(c) prevention of the generation of gases from a heated soil floor and the resulting disturbance of the stability of the pond;

(d) providing weight to hold a plastic liner in place and to counteract any tendency of the liner to float or swell;

(e) providing a barrier against the leakage of hot brine from the heat storage layer, which is saturated with salutes thus protecting against dissolution of possible salt deposits in the sub-soil beneath the pond which could lead to collapse of the soil foundation adjacent the pond;

(6) providing a source of soluble salts for dissolution in the heat-storage layer, resulting in the maximum possible density of the heat storage layer brine and providing the following benefits:

(a) increasing the temperature of the heat storage layer;

(b) improving the pond's stability; and (c) permitting the use of high concentration brine in the wind-mixed layer, thus reducing the cost of flushing and make-up water, which need not be fresh or of very low salinity.

BRIEF DESCRIPTION OF THE DRAWING

Embodiments of the invention are shown in the accompanying drawings wherein:

FIG. 1 is a vertical section taken through a solar pond according to the present invention;

FIG. 2 is a vertical section of a solar pond according to a second embodiment of the invention for storing solid salts; and FIG. 3 is a vertical section of another embodiment of a solar pond for storing solid salts.

DETAILED DESCRIPTION OF THE INVENTION

Referring now to the drawing, reference numeral 10 in FIG. 1 designates a salt water solar pond power plant according to the present invention. Power plant 10 includes salt water pond 2 contained in basin 4 consituted by an excavation in ground 6. Pond 2 includes wind-mixed layer 8 of uniform salinity, usually about 5%, and of a depth of from 25-50 cm. Beneath the wind-mixed layer is halocline 9, generally about 1 m 2 m in depth with a salinity that varies from about 5% at the top to about 30% at the bottom. Below halocline 9 is heat-storage layer 11 of uniform salinity, usually about 30%. As is well known, solar radiation incident on surface 12 of the pond is absorbed in the various layers; and after a period of time, a temperature profile through the pond will match the salinity profile illustrated by reference numeral 14. Typically, the temperature of the upper portion of the heat storage layer will approach 100° C.

Power plant 10 also includes heat exchanger 16 and turbo-generator 18. The heat exchanger contains an organic working fluid, typically Freon, which is vaporized by hot brine pumped into the heat exchanger from diffuser 20 located just below the halocline. The vaporized working fluid is conducted to the turbine of the turbo-generator where expansion takes place causing the turbine to drive the generator which produces electricity. Working fluid exhausted from the turbine is condensed in a condenser (not shown) and returned by a pump (not shown) to heat exchanger 16 thus completing the working fluid cycle. Cooled brine from the heat exchanger is piped to diffuser 21 located in a cooler region of heat storage layer 11 near the bottom thereof thus completing the brine cycle.

In order to prevent precipitation in the cooled brine as it exits the heat exchanger, the present invention also contemplates injecting pre-heated diluted brine into the inlet of the heat exchanger to reduce the concentration of the brine passing through the heat exchanger. This can be effected by inserting mixing valve 23 in the inlet line to the heat exchanger, and by preheating and injecting brackish water into the mixing valve.

The problem of avoiding precipitation of salt in the output side of the heat exchanger, can be avoided by precipitating sodium chloride from the brine that makes up the heat storage layer. The remaining salts left in solution are more soluble than sodium chloride, and do not precipitate in the cooler output side of the heat exchanger. It is frequently the case that brines with which the invention is used include magnesium sulfate and calcium chloride, as well as sodium chloride. Since the former salts are far more water soluble than NaCl, they do not precipitate in the heat exchanger. Moreover, the removal of sodium chloride from the brine permits the concentration of the other salts to be increased. The manner in which this is achieved in the present invention is discussed below.

Evaporation from the pond over a period of time must be replaced in order to maintain surface 12 of the pond and the salinity of the wind-mixed layer. Conventionally, this is done by adding brackish make-up water at a rate that matches the evaporation rate, and periodically flushing the surface of the pond with fresher water. Schematically, the source of brackish water is designated by reference numeral 22.

When the present invention is used to dispose of brackish surface water normally draining into a fresh water river, for example, for controlling the downstream salinity of the river, source 22 represents the brackish surface water which may have a salinity of 2-5%. Normally, control would be exerted over downstream salinity by diverting the brackish water into a storage pond or conducting it to the sea via a canal. The present invention, on the other hand contemplates constructing a solar pond with a basin of a depth greater than that necessary for operation of the solar pond in the conventional manner. That is to say, the usual depth of a basin to contain a salt water solar pond is from 4-6 m. This will provide a heat storage layer of from 2.5-5 m.

As shown in FIG. 1, basin 4 is much deeper than is required for the usual solar pond, and surface 12 is considerably below the grade level at the top of the basin. This construction permits dilute brine from source 22 to be concentrated to the level of the heat storage layer and then added to the heat storage layer of the pond. To this end, evaporation pond 24 is constructed, preferably, adjacent solar pond 2; and the brackish water that is to be stored is diverted to pond 24. Through evaporation, the brackish water is concentrated to the level of the heat storage layer of the solar pond. The concentrated brine is conducted into the basin at the lower level thereof causing surface 12 to rise. Eventually, surface 12 will rise to level 24 which represents the maximum level that can be contained within the pond. With proper design, taking into account the rate at which brackish water is produced, and the area of the pond, the time required for the surface of the pond to rise to level 24 can be measured in years. However, future disposal of brackish water is provided for in the present invention by using the pond thus filled as a breeder pond for another solar pond. That is to say, once pond 10 is filled, or partially filled, the concentrated brine in the heat storage layer can be pumped out into another basin whose profile matches that of the breeder pond (i.e., is deeper than is actually necessary for the rate at which electricity is to be generated). The necessary halocline can be constructed by selective mixing of the concentrated brine with the brackish water that is available; and the power plant can be enlarged to produce more electricity.

In concentrating the brackish water in the evaporation pond, differential precipitation occurs; and sodium chloride precipitates in the pond when the concentration reaches about 27%. Continued evaporation results in an increase in the concentration of the remaining minerals to the level of the heat storage layer. In order to carry out this process over a long period of time, the precipitated salts must be harvested and disposed of. The present invention contemplates disposing of the harvested salts at the bottom of the solar pond where the salts remain in substantially solid form because the concentration at the bottom of the heat storage layer is in excess of the concentration at which the salts precipitated out in the evaporation pond.

In accordance with the present invention, the solar pond may be constructed such that the pond is non-uniformly deep. This is illustrated in FIG. 2 where solar pond 30 is shown as basin 32 having pit 34 in the bottom. When initially constructed, the surface 36 of the pond will be further below the rim of the basin than is shown in FIG. 2; and pit 34 will contain brine of the same salinity as heat storage layer 38. The salinity profile of the pond is shown at 40. As the evaporation pond associated with the solar pond produces precipitates and concentrated brine, precipitate 39 is sent by chute (not shown) into pit 34, and the concentrated brine is introduced into heat storage layer 38. Both situations result in raising level 36 of the pond.

Storage of precipitated salts can also be achieved using a flat-bottomed basin as illustrated in FIG. 3. Pond 50 in FIG. 3 comprises basin 52 into the bottom of which precipitated salts are dumped. Precipitate 54 is uniformly distributed over the bottom of the pond. The presence of solid material at the bottom of the pond gives rise to second halocline 56 immediately above the precipitate. The salinity profile of the pond, as shown by reference numeral 58, is a maximum at the bottom of the pond. In the region of the interface between the precipitate and the liquid near the bottom of the pond, the concentration gradient decreases sharply with elevation forming halocline 56. In this pond, hot brine is extracted near the top of the heat storage layer and returned at a lower point. The region of the heat storage layer between the levels at which extraction and injection occur is effectively a mixed region of uniform density sandwiched between two non-convective layers. In this sandwiched layer, the solution is not saturated and therefore no dilution is necessary as in (23) to prevent salt precipitation in the heat exchangers.

In ideal circumstances, the solar ponds described above would be sited at the source of the brackish water in order to reduce transportation costs associated with bringing salts to the site. This is not a trivial consideration because the amount of salt needed to construct a solar salt water solar pond ranges from half- to three-quarters of a ton per square meter of pond surface. Thus, a pond 1 Km×1 Km capable of generating 5 MW would require from 500,000 to 750,000 tons of salt. The cost of this material, and the cost to transport this material to the selected site together with the cost of earth-moving and ground preparation make the production of large scale salt water solar ponds very costly. By using the brackish water as the raw material for the pond, and locating the pond near the source of the brackish water, significant cost savings can be achieved.

During the time that the basin is being prepared, shallow evaporations pond are constructed to begin the concentration of the brine that is necessary for the pond. Over a period of time, the brackish water is converted into brine of a concentration suitable for the heat storage layer of the pond. Precipitated sodium chloride is harvested during the process, and may be distributed over the bottom of the basin after it has been prepared in the manner described below. In constructing the pond, the earthen bottom of the basin may be covered by a water-impermeable, continuous plastic liner (not shown), preferably comprising two, overlying thin plastic sheets. Instead of dumping earth on the sheets to hold down and position the sheets, a continuous layer of solid salt precipitate may be applied to the sheets. The combination of the salt and the liner forms an effective barrier against seepage of brine into the soil beneath the pond.

The pond itself, at this stage, may be used to evaporate brackish water; and eventually, concentrated brine will fill the basin to a depth of 2-5 m forming the heat storage layer which will be deep enough to sustain operation of the pond as a heat source for the power plant after the halocline is created and sufficient time has elapsed for the pond to absorb solar energy and reach its operating temperature.

The halocline is created by mixing dilute brine with the concentrated brine to form successive levels of decreasing concentration. At this stage, the pond has been created from the brackish water; but it is not operational. While the newly constructed pond is collecting heat, additional ponds can be constructed. Alternatively, construction of additional ponds can be deferred until the surface of the original pond rises to its maximum level.

As noted previously, the addition of these precipitates to a solar pond provides numerous benefits. To begin with, they make it possible to implement successful water-desalination projects by providing a sink for storing the unwanted by-product in a manner that reduces the risk of subsequent damage to the environment. Furthermore, the addition of precipitates to the pond increases the concentration of the heat storage layer and this enables the temperature of that layer to increase, thereby enhancing its utility as a source of heat for production of electricity. Another advantage is that the precipitated salt can function as a ballast when used in ponds whose earthen bottom has been covered with a plastic sheet or film, by weighting down such sheet or film to prevent its displacement from the bottom or swelling or dispersion.

The advantages and improved results achieved by the method and the modified solar pond of the present invention are apparent from the foregoing description of the invention. It should be obvious that various changes and modifications may be made without departing from the spirit and scope of the invention, as sought to be defined in the claims which follow.

I claim:

1. A method for disposing of waste brine comprising the steps of:
   a. building a salt water solar pond having a halocline overlying a heat storage layer; and
   b. introducing the waste brine into the solar pond.

2. A method according to claim 1 including the step of concentrating the waste brine before introducing the concentrate into the solar pond.

3. A method according to claim 2 wherein the concentrate is introduced into the heat storage layer.

4. A method according to claim 1 wherein the waste brine is introduced into the pond at a level thereof where the density is not less than the density of the introduced brine.

5. A method according to claim 1 including the step of constructing a basin for the pond so that the depth of the basin exceeds the depth required to operate the pond as a heat sink, and the introduction of waste brine raises the level of the pond.

6. A method according to claim 2 including removing precipitated salts from the concentrated brine before introducing the latter into the pond.

7. A method according to claim 6 including depositing precipitated salts on the bottom of the pond.

8. A method according to claim 1 including constructing the pond so that the depth thereof is non-uniform, and depositing precipitated salts in the deeper portions of the pond.

9. A method for extracting heat from the solar pond according to claim 2 wherein brine from said heat-storage layer is passed through a heat exchanger.

10. A method according to claim 9 wherein precipitation of salts within said heat exchanger is avoided by adding to said hot brine, as it enters said heat exchanger, a preheated dilute salt solution having a temperature sufficient to prevent said precipitation from the brine as cooled in the heat exchanger.

11. A method according to claim 9 wherein precipitation of salts within said heat exchanger is avoided by precipitating sodium chloride from the waste brine before it is introduced into the solar pond.

12. A method according to claim 11 wherein the precipitate from the waste brine is deposited on the bottom of the pond thereby establishing a lower halocline, the heat storage layer being sandwiched between the lower halocline and the upper halocline.

13. A method according to claim 5 including constructing a solar pond using brine from the heat storage layer of the first solar pond.

14. A method for preventing the leakage of brine through the earthen bottom of a salt-water solar pond including the steps of providing said earthen bottom with a continuous covering comprising a water-impermeable plastic liner comprised of at least one, thin plastic sheet; adding salts or brines to the heat-storage layer of said solar pond above said liner in such a quantity that salt solids are precipitated from said heat-storage layer to form a continuous layer of salts upon said liner, the combination of said liner and said continuous layer of salts upon it comprising a brine-impermeable lining upon said earthen bottom.

15. A method according to claim 14 wherein said liner comprises a plurality of contiguous, overlying plastic sheets.

16. A method for storing solid salt comprising constructing a salt water solar pond in a basin in the ground having a bottom and side walls, wherein said bottom includes a depression within it, and depositing said solid salt in said depression.

17. A method according to claim 16 wherein said solid salt is deposited into said depression prior to the addition of water to said basin to create said pond.

18. A method according to claim 17 wherein said solid salt is deposited through a chute after said salt-water solar pond has been created.

19. A practical and environmentally acceptable method for disposing of waste salts and brines from industrial processes or water-desalination projects, said and brine interception projects, or other activities generating waste salts or brines comprising transporting said waste salts and brines from the sites of such processes or projects or activities to a salt-water solar pond, and introducing them into said pond so as to result in the precipitation of salts at the bottom thereof.

20. A method according to claim 19 including transporting said waste salts and brines from the sites of such processes, projects or activities to a salt-water solar pond, and using them to flush the surface of the pond or to provide make-up water to replace evaporation losses of the pond.

21. A method according to claim 19 wherein said waste salts or brines are concentrated in an evaporation pond before being introduced into the pond.

22. A method for disposal of waste salts and brines comprising the steps of transporting said waste salts and brines to a salt-water solar pond which is sealed against leakage of hot brine and adding said waste salts and brines to said pond in quantities beyond those critically necessary for a functioning salt-water solar pond.

23. In salt-water solar pond having a wind-mixed layer adjacent to the surface of the pond, a stratified, non-convective halocline immediately therebelow, and a heat-storage layer adjacent to and immediately below said halocline for storing heat absorbed by the heat storage layer, said heat-storage layer extending downward to the bottom of said pond for storing heat, the salinity of said heat-storage layer being greater than the average salinity within the halocline; the improvement comprising precipitated salts covering the bottom of the pond.

24. A solar pond according to claim 23 wherein said heat-storage layer has a salt-concentration gradient that, in its upper part, is not saturated, and, at its bottom, is saturated.

25. A method for lining the earthen bottom of the heat-storage layer of a salt-water solar pond including the step of adding salts or brine to said heat-storage layer in such a quantity that salt solids are precipitated from said heat-storage layer to form a continuous lining upon said bottom.

26. A method for preventing the migration of debris from the earthen bottom of the heat-storage layer of a salt-water solar pond into said heat-storage layer, including the step of adding salts or brine to said heat-storage layer in such a quantity that salt solids are precipitated from said heat-storage layer to form a continuous carpet of salts upon said bottom.

27. In combination:
(a) a source of brackish water;
(b) an evaporation pond for receiving said brackish water and concentrating it:
(c) a salt water solar pond power plant having a solar pond that includes a halocline overlying a heat storage layer for converting heat stored in the heat storage layer into electricity; and
(d) a second solar pond for receiving concentrated brine from the first mentioned solar pond to thereby reduce the level thereof.

28. The combination of claim 27 further including precipitated salts on the bottom of the solar pond.

29. The combination of claim 27 wherein the bottom of the solar pond contains a depression, and precipitated salts are contained in the depression.

30. In combination:
(a) a salt water solar pond having a wind-mixed layer adjacent the surface of the pond, a stratified, non-convective halocline immediately therebelow, and a heat storage layer containing non-saturated brine adjacent to and immediately below said halocline for storing heat;
(b) a layer of precipitated salts covering the bottom of the pond;
(c) a stratified, non-convective secondary halocline interposed between the heat storage layer and the layer of precipitated salts; and
(d) a heat exchanger for exchanging heat contained in brine from the heat storage layer exchanged.

31. In a solar pond power plant of the type having a salt water solar pond that includes a stratified, non-convective main halocline overlying a heat storage layer of brine in which solar heat is stored, and having a heat exchanger for exchanging heat contained in said brine, the improvement comprising a layer of precipitated salts covering the bottom of the pond and a stratified, non-convective secondary halocline thereabove interposed between the heat storage layer and the layer of precipitated salts whereby the concentration of the brine in the heat storage layer is low enough to prevent precipitation in the heat exchanger after the brine is cooled.

* * * * *